United States Patent [19]

Lowe

[11] 4,104,612
[45] Aug. 1, 1978

[54] HEAD-UP DISPLAY COMMAND BAR GENERATOR

[75] Inventor: James R. Lowe, Palos Verdes, Calif.

[73] Assignee: McDonnell Douglas Corporation, Long Beach, Calif.

[21] Appl. No.: 765,254

[22] Filed: Feb. 3, 1977

[51] Int. Cl.² ............................................. G08G 5/00
[52] U.S. Cl. ............................ 340/27 AT; 73/178 T; 364/428
[58] Field of Search ....................... 244/181, 182, 186; 235/150.2, 150.22; 73/178 R, 178 T; 340/27 R, 27 AT

[56] References Cited

U.S. PATENT DOCUMENTS

| | | | |
|---|---|---|---|
| 3,743,221 | 7/1973 | Lykken | 244/186 |
| 3,887,148 | 6/1975 | Devlin | 235/150.22 |
| 3,967,799 | 7/1976 | Muller | 340/27 AT |
| 3,976,267 | 8/1976 | Meyer | 244/186 |
| 3,980,258 | 9/1976 | Simeon | 244/182 |

Primary Examiner—Trygve M. Blix
Assistant Examiner—Reinhard J. Eisenzopf
Attorney, Agent, or Firm—Walter J. Jason; Donald L. Royer

[57] ABSTRACT

This apparatus generates a signal to control the vertical position of a horizontal bar indicator in a head-up display for viewing by the pilot of an aircraft so that the bar is superimposed on the pilot's view of the runway to assist him in controlling the pitch attitude of the aircraft during landing. The apparatus forms the bar control signal by operating on selected dynamic parameters of the aircraft to generate a lead compensation angle signal. A signal representative of the product of the lead compensation angle signal and a gain factor signal that is a function of the aircraft's altitude is summed to a signal representative of the glide path angle selected by the pilot to produce the desired bar control signal. In IFR conditions the bar may be superimposed with suitable flight director indications on the head-up display.

13 Claims, 9 Drawing Figures

HEAD-UP DISPLAY COMMAND BAR GENERATOR

BACKGROUND OF THE INVENTION

This invention relates to aircraft control systems and more particularly to a system for use during landings which presents to the pilot a command bar indication on a head-up display.

During visual landing approaches, when outside cues are degraded, it is difficult for the pilot to maintain a desired fixed angle path to touchdown. Particularly during black hole approaches, and with no horizon reference, an excessive deviation from the path can occur before the pilot can detect it visually. To solve this, a horizontal bar projected onto a transport lens in the pilot's line-of-sight was developed to provide a reference indicating his position relative to the desired approach path. This is called a head-up display(HUD). Pilots found it difficult to avoid vertical oscillation when flying with the aid of only this position reference. Therefore, most HUD designs include aircraft direction of motion (velocity vector) as well as position.

The following discloses a new design that does not require velocity vector computation to aid pilots in damping vertical oscillation. The damping results from a signal, derived electronically from measured aircraft motion parameters. The signal deflects the bar relative to the desired fixed angle according to an optimized control law. It provides anticipation of aircraft motion. It does not have the weaknesses of prior designs which either are subject to wind error (constant wind or windshear), or require an inertial navigation system(INS). The total bar drive signal of the disclosed design consists of a signal representative of a gyro stabilized fixed angle summed with lead compensation signals. Various lead compensation circuits are included to improve dynamic characteristics. Aircraft altitude rate is coupled through a high pass filter (washout circuit) to remove the steady state descent rate and produce a rate compensation signal. This is adequate, but improved dynamic response is gained with the combination of aircraft pitch angle coupled through a high pass filter, pitch rate, and normal acceleration. Also, to match the effect of increased angular sensitivity to vertical deviations from the fixed path as the runway is approached, the gain of the compensation terms are increased as a function of reduced altitude. Normal acceleration can be substituted for differentiated altitude rate in the high pass filter to avoid the dynamic problems that can result from poor altitude rate measurement caused by the effect of changing angle of attack on the static port. Satisfactory compensation can also be derived using normal acceleration only, which is coupled into a lag-lead network. This can be used in aircraft that approach to land while holding constant pitch, such as short take off and landing(STOL) aircraft approaching on the backside of the drag curve. Other combinations of lead compensation signals can also produce good dynamic characteristics.

Figure 1:
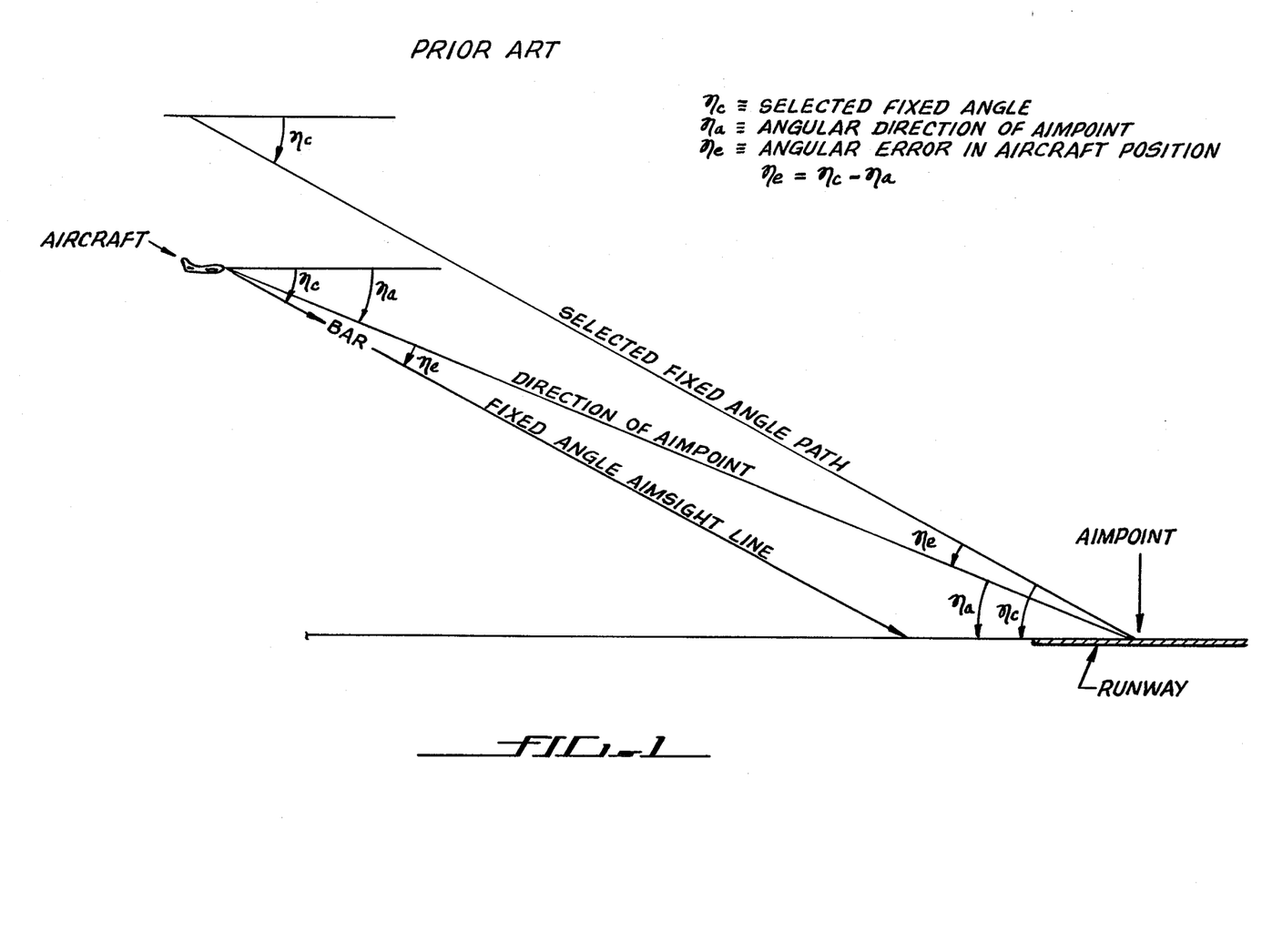
FIG. 1 is a geometric diagram of the fixed path parameters.

Prior designs of the landing approach HUD depend upon two basic functions, distance the aircraft is off the desired approach path (indicated by position error $\eta_e$) and direction of motion of the aircraft (velocity vector $\gamma$). Several variations of this design have been developed. The simplest HUD is an aimsight depressed a fixed angle below the horizontal ($\eta_c$ FIG. 1). The aimsight is a horizontal bar projected onto a transparent viewing lens in the pilot's line-of-sight. The bar appears superimposed on the outside world. It lines up with the runway aimpoint only when the aircraft is on the selected fixed angle path that terminates at the aimpoint. Whether or not the aircraft is on the path, the aimpoint direction is defined by an angle $\eta_a$ (FIG. 1). The distance the aircraft is off the path is reflected by the angular displacement of the bar from the aimpoint ($\eta_e$ FIG. 1). $\eta_e = \eta_c - \eta_a$. The pilot acquires and stays on the path by maneuvering the aircraft to hold the bar on his aimpoint, that is, he tries to keep $\eta_e$ equal to zero. Vertical oscillation can occur while tracking this position reference when visual cues are limited, such as at night where only approach and runway lights are available for visual orientation.

To solve this the HUD was designed to include, in addition to the position reference, a direction of motion reference, or velocity vector angle ($\gamma$). Velocity vector is computed either from angle of attack ($\alpha$), or from vertical speed ($h$) divided by horizontal speed. Horizontal speed is derived either from indicated airspeed (IAS) or ground speed (gnd spd). See FIG. 2. In various HUD designs $\gamma$ is combined with $\eta_c$ in different ways: One design uses two bars, one showing the depression angle of the desired path ($\eta_c$), and the other, the depression angle of the velocity vector ($\gamma$). Another design electronically combines in a single bar a fraction of $\eta_c$ with a fraction of $\gamma$, the total of these two fractions equaling one, i.e., Bar depression angle = $K\gamma + (1-K)\eta_c$.

Each of the possible variations, indicated above, contains some disadvantage.

Figure 2:
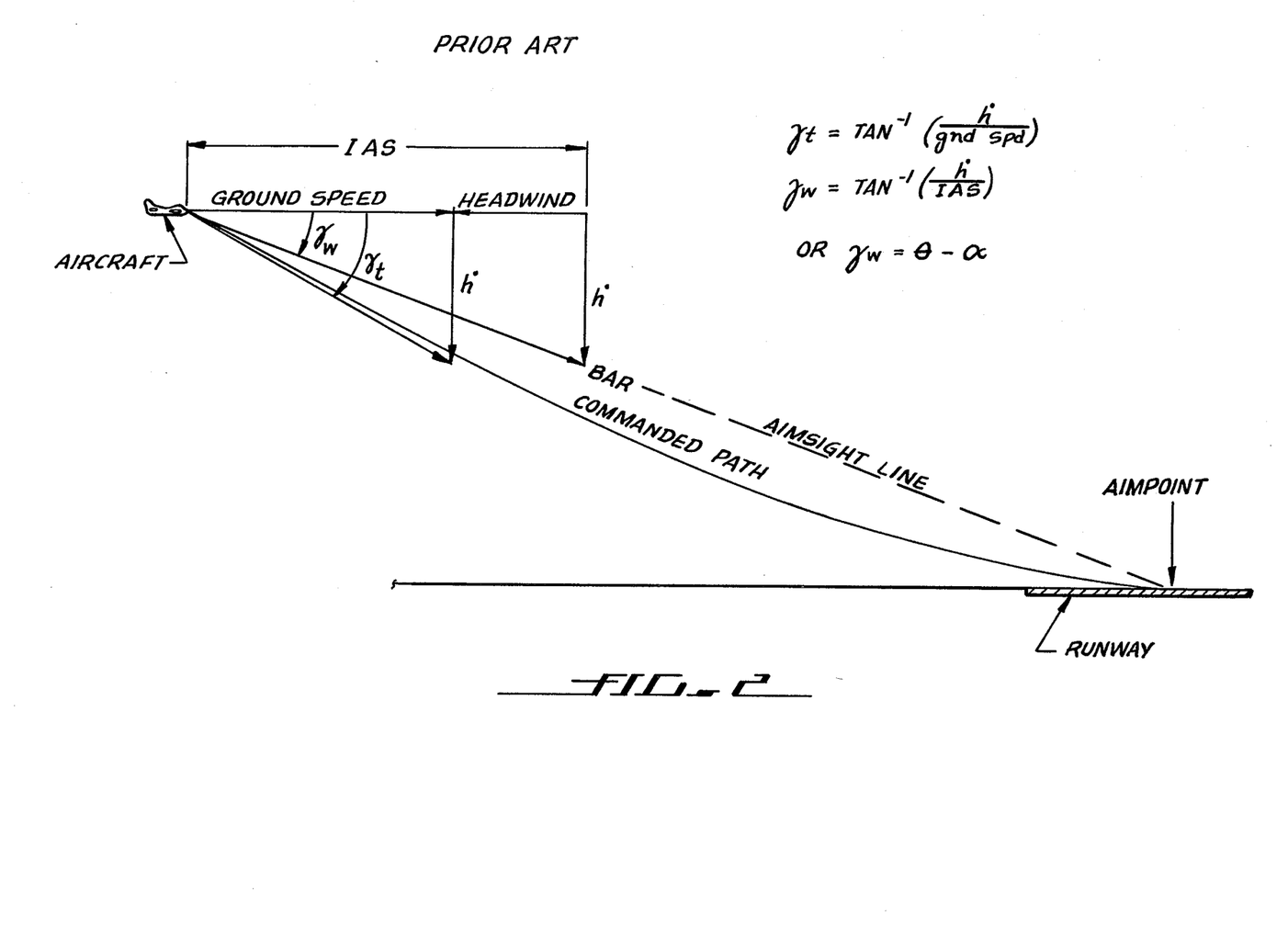
FIG. 2 is a geometric diagram of a velocity vector commanded approach.

$\alpha$ and IAS are airmass measurements and as such are subject to wind error. That is, there is a difference between true glidepath angle relative to the ground ($\gamma_t$) and glidepath angle relative to the airmass ($\gamma_w$). As shown in FIG. 2 a headwind will cause $\gamma_w$ to be a shallower angle than the true descent angle ($\gamma_t$). By holding $\gamma_w$ on his aimpoint, the pilot continuously directs the aircraft on an approach angle that is steeper than the direct line to the aimpoint. This results in the pursuit curve shown in FIG. 2.

An additional disadvantage of using $\alpha$ to compute $\gamma$ results from the short term effect of vertical windshear. A quick increase in downdraft (or reduction in updraft) causes a decrease in $\alpha$ until aircraft inertia is overcome by the downdraft and aircraft descent rate increases accordingly. The reduced $\alpha$ causes $\gamma_w$ to be less negative, moving the bar up which directs the pilot to fly down to hold the bar on the aimpoint. It is apparent that this is the wrong response to this windshear.

Where horizontal speed is the ground speed computed in an inertial navigation system (INS), the velocity vector provides accurate control. However, two weaknesses remain; (1) the aircraft must have an INS and (2) the combination of $\eta_c$ and $\gamma$ still does not produce accurate optimized control.

SUMMARY OF THE INVENTION

The design disclosed herein, which shall be called "Compensated," results from the recognition that the velocity vector is not essential to landing approach HUDs. Substituted for the velocity vector is a vertical rate term that does not require horizontal velocity. By summing a form of washed out altitude rate with the selected fixed path angle ($\eta_c$), the aircraft will be controlled to the fixed glidepath and at the same time have adequate damping. Various lead compensation terms are utilized in the design. Glidepath control is optimized for all conditions of aircraft operation; wind, windshear and gusts by selecting gains and time constants of the compensation network for a specific aircraft.

DETAILED DESCRIPTION OF THE INVENTION

Figure 3:
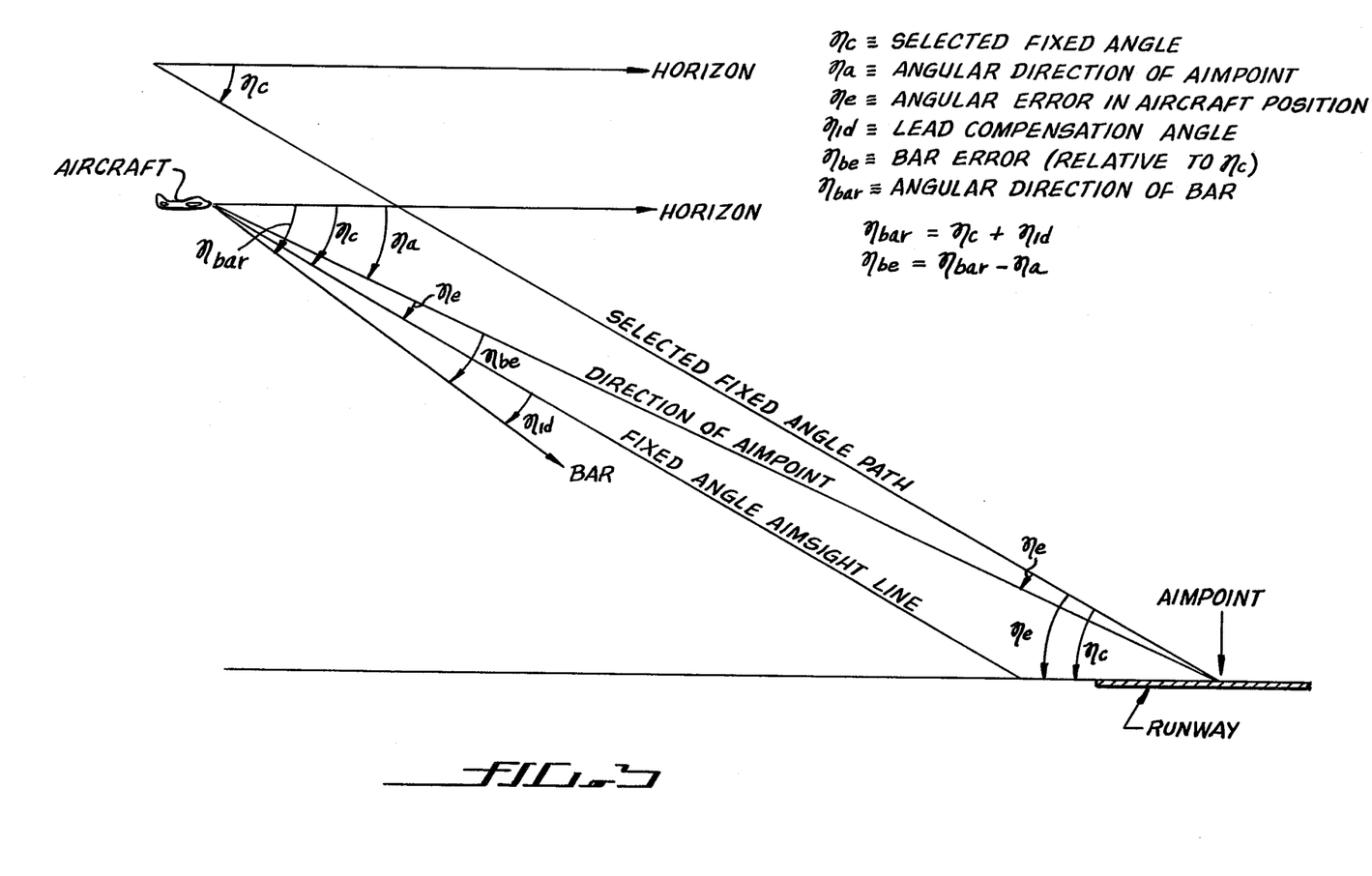
FIG. 3 is a geometric diagram of the "compensated" system.
Figure 4:
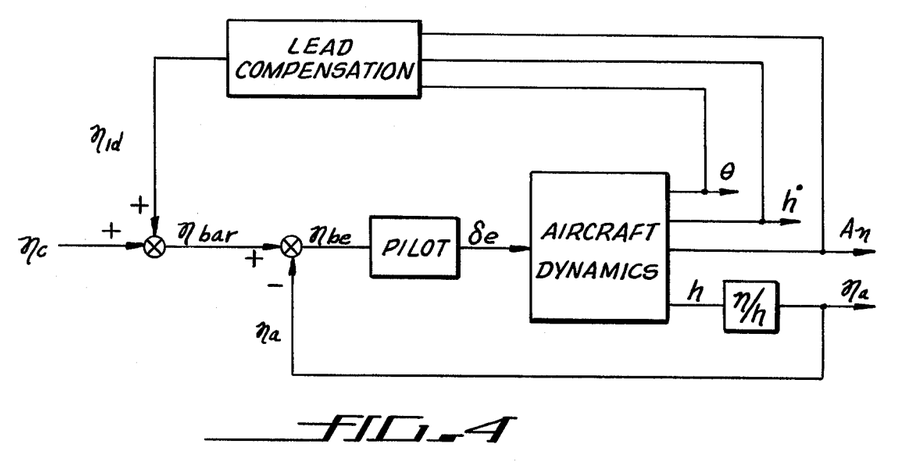
FIG. 4 is a closed loop block diagram of the "compensated" system.

Explanation of the parameters that compose the "Compensated" design will be made by reference to FIGS. 3 and 4. In the section Background of the Invention the description of the earliest HUD defined $\eta_c$ as desired glideslope angle, $\eta_a$ as aimpoint sight angle, and $\eta_e$ as error between glideslope angle and sight angle. "Compensated" has added to this basic HUD a lead compensation signal $\eta_{1d}$ derived from aircraft motion transients. In the steady state $\eta_{1d}$ equals zero. The total deflection of the bar relative to the horizontal ($\eta_{bar}$) is equal to the fixed glideslope angle ($\eta_c$) which may be selected by the pilot, plus a lead compensation signal ($\eta_{1d}$). The error seen by the pilot ($\eta_{be}$) is the angular distance between the direction indicated by the bar ($\eta_{bar}$) and his line-of-sight to his aimpoint ($\eta_a$) i.e., $\eta_{be} = \eta_{bar} - \eta_a$. The geometrical relationships of these vertical angles are diagrammed in FIG. 3 and their computational relationships are shown in the block diagram of FIG. 4. FIG. 4 contains the closed loop block diagram of an embodiment that requires pitch ($\theta$), altitude rate ($\dot{h}$), and normal acceleration ($A_n$) for compensation control law circuit inputs.

The following will first describe how the display is generated, which is not a part of the invention, then explain the various embodiments of the circuits disclosed for the "Compensated" HUD, and finally detail the control law circuit module for one embodiment.

Figure 5:
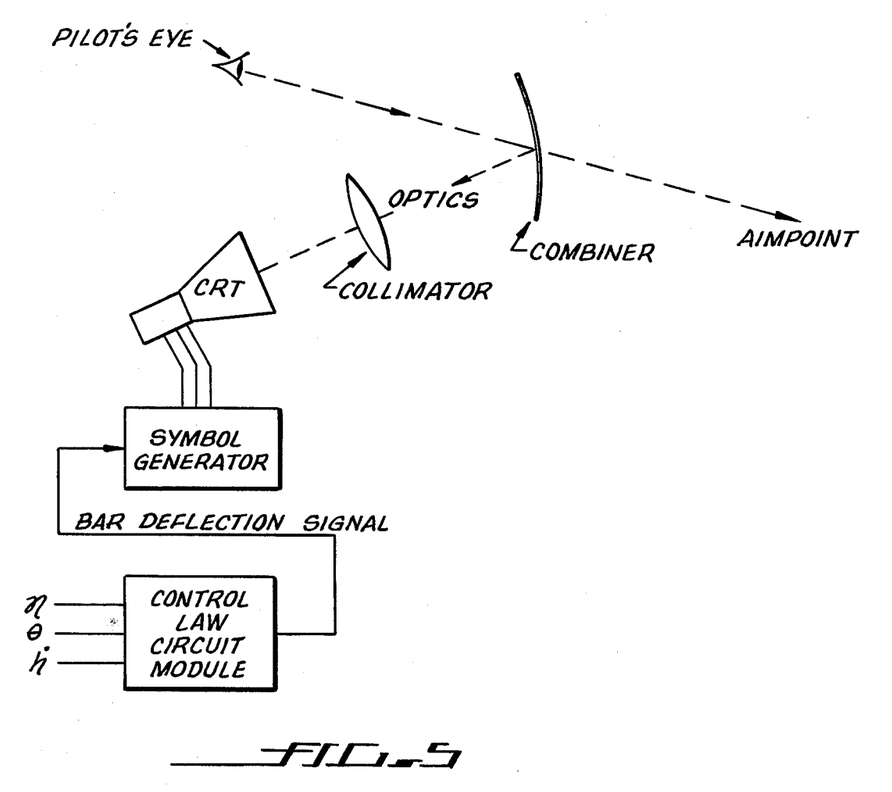
FIG. 5 is a signal flow diagram of a HUD system.

The circuits which constitute the disclosed invention make up the control law circuit module. Three other basic component parts, the symbol generator, CRT and optics complete a HUD system, (FIG. 5). The latter three are available commercially, for example, the Bendix MicroHUD.

The signal flow of the complete HUD system of FIG. 5 may be described as follows. A selected glidepath angle plus aircraft motion terms like pitch and altitude rate are coupled into the control law circuit module which generates the deflection signal. The deflection signal is coupled into the symbol generator which generates the image of the command bar on the CRT. The deflection signal controls the vertical location of the command bar. The CRT image is projected onto a collimating lens, and combiner, which is a non-interfering transparent glass located between the pilot's eyes and his forward field of view. The command bar appears to the pilot as superimposed on his view of the runway during a landing approach. The collimated command bar constitutes an aimsight. In steady state a deflection signal transmitted from the control law module represents the selected glidepath angle causing the aimsight (collimated command bar) to be held at the selected angle relative to the horizontal. If the aircraft is on the selected glidepath, the pilot will see the bar superimposed on his runway aimpoint. Should the pilot see the bar above or below his aimpoint, he interprets it as glidepath error and corrects with elevator control. An aircraft maneuver produces transients in the aircraft motion terms which are coupled into the control law circuits completing the loop of the "Compensated" HUD system.

So that the bar will not pitch with the aircraft, pitch angle is subtracted from the command bar deflection signal (a function in all prior HUD designs). While an aircraft flies steadily on the glidepath, the command bar remains at the selected glidepath angle relative to the horizon. A windshear or pilot action that causes a change in aircraft motion will cause a change in the signals that are coupled into the control law circuit module. In the module the motion signals are altered and summed with the selected fixed glidepath signal moving the command bar, which gives the pilot anticipation (or lead) of aircraft motion before it is apparent to him in any other way.

In the simplest embodiment of the disclosed invention, the lead is obtained from altitude rate coupled through a high pass filter (washout circuit). A change in altitude rate will immediately be reflected in change in command bar deflection angle causing the pilot to correct immediately, whereas without the altitude rate lead it would be a while before a positional error is large enough to be seen. Any correction of aircraft motion causes the command bar to deflect indicating the amount of his correction and preventing overcorrection. Thus if proper parameter gains have been selected in the control laws, the aircraft will return to the selected fixed path smoothly without excessive overshoot according to the principles of control systems design. The altitude rate is washed out so that only a change in descent rate will deflect the command bar from the selected fixed path angle, that is, steady state altitude rate is removed. The high pass filter time constant is long enough to damp long period transients, but not so long as to produce a serious error from a long term altitude rate change such as acquisition of the glidepath from the horizontal. This embodiment by itself produces good results, however, further improvement is possible.

Lead compensation can also be derived from aircraft pitch. Like altitude rate it provides aircraft motion damping by anticipating that motion. Pitch is coupled through a high pass filter to remove steady state pitch. Higher frequency lead is derived from pitch rate compensation and/or normal acceleration.

Two valuable embodiments generate the lead compensation feedback from (1) pitch with pitch rate and normal acceleration and (2) normal acceleration only. The advantage of (1) above is that it requires only inertial terms, pitch and acceleration to produce optimum dynamic characteristics. Since only inertial terms are used in the dynamic loop, the problems associated with barometric measurements are avoided, particularly the dynamic error in altitude rate that commonly occurs due to the effect of changes in angle of attack on static port response. The purpose of (2) above is to provide the desired dynamic characteristics when HUD is used on aircraft that approach to land on the backside of the drag curve, holding constant pitch. In (1) above, the normal acceleration specified includes a lower frequency function and may or may not contain the high frequency normal acceleration lead, whereas (2) above is optimized with both. The lower frequency function is derived from lagged normal acceleration, a lag in the vicinity of 10 seconds. This is equivalent to washed out altitude rate (differentiated altitude rate equals approximately normal acceleration).

Figure 6:
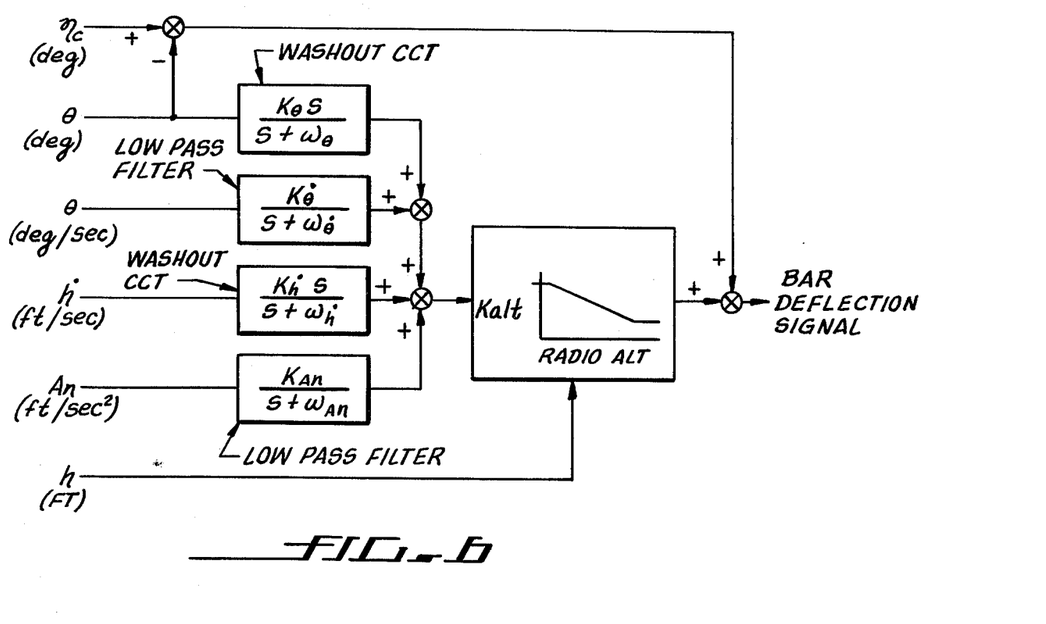
FIG. 6 is a block diagram of control law circuits for one embodiment of the "compensated" design.

As the distance of aircraft from aimpoint reduces, the sensitivity of angular error to elevator control (or altitude error) increases. Therefore to maintain optimum dynamic characteristics, the gain of the compensation signal is increased accordingly before it is summed with the selected fixed angle. Since exact gain is not critical in this design, aircraft radio altitude can be substituted for distance to aimpoint and the gain changes can be programmed linearly (FIG. 6). Programming the compensation signal gain is desirable but not necessary.

A sample block diagram of one embodiment of the control law circuits is shown in FIG. 6. A constant voltage ($\eta_c$) is scaled to depress the bar from the horizontal by the selected angle. Pitch ($\theta$) from a pitch attitude sensor, scaled like $\eta_c$, is coupled into a summing amplifier with $\eta_c$. Polarities are such that negative $\eta_c$ moves the bar down while negative $\theta$ deflects it up. Pitch is also coupled through a washout circuit (high pass filter). Derived or sensed pitch rate is coupled through a lag circuit (low pass filter). Altitude rate derived from barometric altitude is coupled through a washout circuit. Normal acceleration from an accelerometer is coupled through a lag circuit.

Each of these filtered aircraft motion parameters are coupled into a summing amplifier, the output of which contains the lead compensation signal. The compensation signal is coupled into a multiplier where it is multiplied by a function of radio altitude so that the gain of the compensation signal will reduce linearly with altitude below a given altitude. Above the given altitude the gain remains constant. The gain programmed compensation signal is coupled into a summing amplifier where it is summed with the ($\eta_c - \theta$) signal. Polarity is such that upward motion of any aircraft parameter composing the compensation signal will deflect the bar upward.

Figure 7:
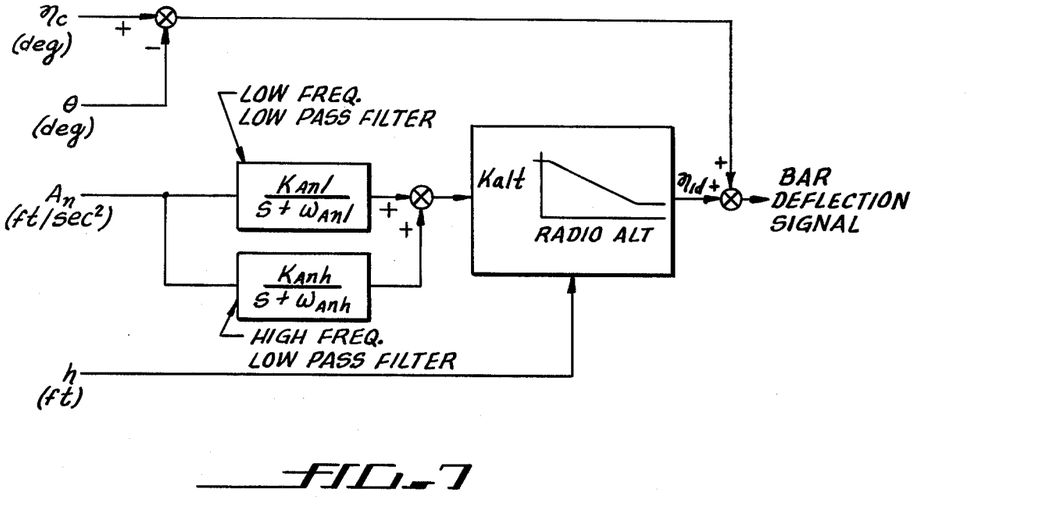
FIG. 7 is a block diagram of control law circuits of the "compensated" design to show An used in place of sh.

Different combinations of the aircraft parameter inputs shown in FIG. 6 cover most of the possible embodiments. Other embodiments include a normal acceleration lagged at a relatively low frequency which is equivalent to the washed out altitude rate of FIG. 6. This lagged normal acceleration is shown in FIG. 7. The relatively low frequency lag (in the area of 10 sec.) added to a high frequency lag (in the area of 0.1 sec.) constitutes a laglead-lag filter for the normal acceleration input.

As described earlier, angular sensitivity to vertical deviation from the fixed path reduces as distance from the aimpoint increases, which results in reduced damping at large distances. At large distances an improvement is possible by combining "compensated" damping with other methods. Large distances, defined here, are in the order of 10,000 or 20,000 feet from aimpoint. Closer than this, because accuracy of landing approaches becomes critical, full "compensated" control should be used. At greater distances where altitude error is not critical, a CAT I or CAT II ILS beam can be used, and where ILS is not available, a velocity vector signal can be combined with the "compensated" signal.

So as not to complicate the previous explanation, discussion of the addition of a flight director (FD) pitch command bar to the HUD has been delayed until now. The HUD can be operated under IFR conditions (zero visibility) by converting the HUD to a FD. The "compensated command bar" becomes the FD fixed aircraft symbol, and a FD pitch command bar is added to the display. While flying IFR, the pitch command bar is substituted for the runway aimpoint. The only difference, to the pilot, from the "compensated" procedure is that he flies the aircraft symbol ("compensated bar") to the pitch command bar rather than to the runway aimpoint. When the runway becomes visible, he can switch to the "compensated" mode.

In addition to its use in IFR conditions, the FD mode can provide improved damping at the greater distances. Closer in, when the runway itself gives a better position reference, the "compensated" mode is selected which switches off the FD. Then the pilot flies the aircraft symbol (now "compensated bar") to the runway aimpoint.

Figure 8:
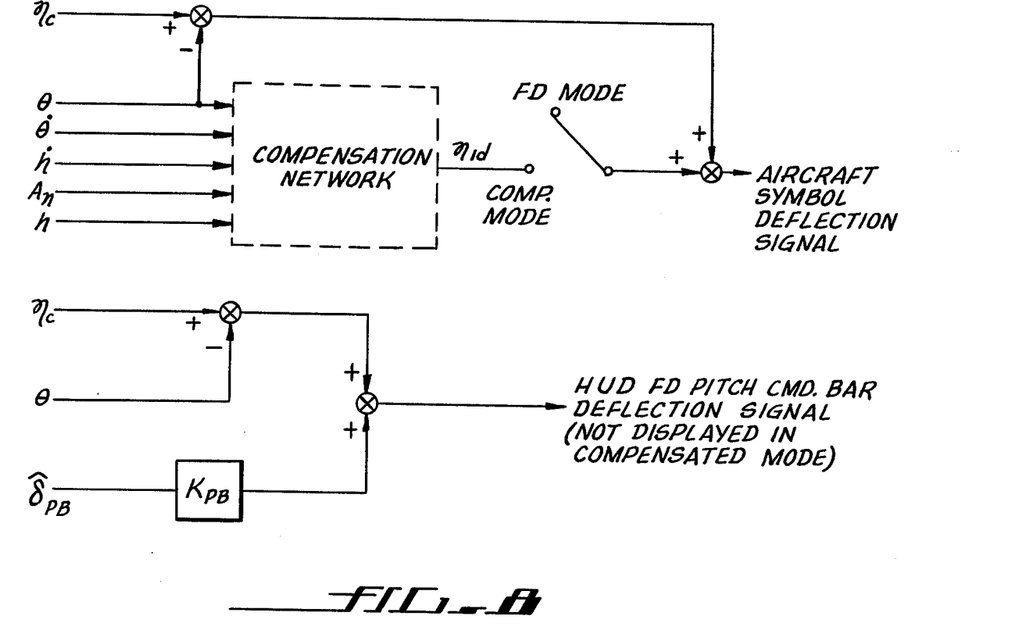
FIG. 8 is a block diagram of a "compensated" alternate flight director mode.

The design is shown in the block diagram, FIG. 8. In the FD mode, the FD pitch bar signal ($\delta$ PB) contains lead compensation. Therefore the lead that is added to the aircraft symbol in the "compensated" mode is switched out when in the FD mode. When "compensated" is selected, the pitch command bar is switched off and the lead compensation signal $\eta_{ld}$ is added to the fixed path signal to generate the aircraft symbol deflection signal. The approach then becomes "compensated" controlled as previously described. The selected approach angle $\eta_c$ must equal the glidepath angle of the particular ILS beam.

Figure 9:
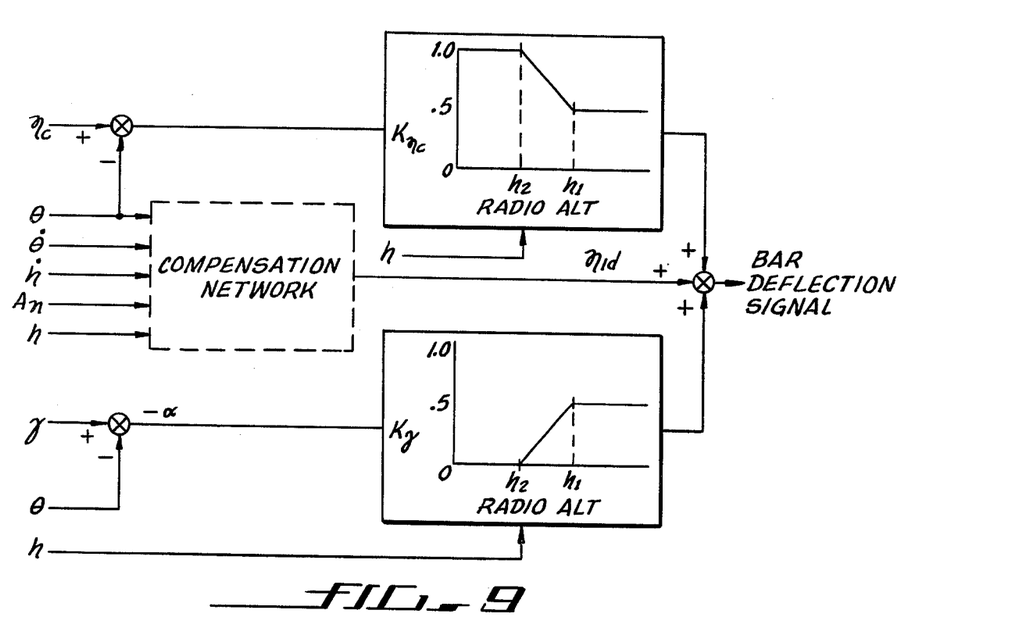
FIG. 9 is a block diagram of an embodiment that combines "compensated" with velocity vector.

In the absence of an ILS beam, more damping at greater ranges is achieved, at a sacrifice in accuracy, by combining velocity vector with "compensated." This embodiment includes an automatic smooth transition into full "compensation" as shown in FIG. 9. "Compensated" damping is added to the sum of a selected path angle signal plus a velocity vector signal. Above a given altitude $h_1$, the bar deflection contains 0.5 selected path angle ($\eta_c$) and 0.5 velocity vector ($\gamma$). As the altitude $h_2$, where accuracy becomes more critical, is approached, $\gamma$ is reduced in the same proportion as $\eta_c$ is increased, until at $h_2$ the bar is deflected by pure "compensated" input.

While an exemplary embodiment of this invention has been described above and shown in the accompanying drawings, it is to be understood that such embodiment is merely illustrative of, and not restrictive on, the broad invention and that I do not wish to be limited in my invention to the specific construction or arrangement described and shown, for various obvious modifications may occur to persons having ordinary skill in the art.

I claim:

1. Apparatus for providing to the pilot of an aircraft during visual landing approaches the image of a horizontal bar projected onto the lens of a head-up display, said bar indicating to the pilot the point at which the aircraft will touch down on the runway, said apparatus comprising;

means for generating a fixed angle signal proportional to the desired approach angle of descent,
means for generating a lead compensation signal,
means for generating a gain factor signal that varies as a function of aircraft altitude,
a multiplier circuit for generating the product of said lead compensation signal and said gain factor signal, and
a summing amplifier for adding said fixed angle signal and the product generated by said multiplier circuit to control the vertical deflection of said horizontal bar.

2. The apparatus of claim 1 wherein said means for generating said fixed angle signal comprises
means for generating a pitch attitude signal, and
a summing junction for combining a constant signal level representative of a desired angle of aircraft descent with the negative of said pitch attitude signal to obtain said fixed angle signal.

3. The invention according to claim 1 wherein the means for generating said lead compensation signal comprises
means for providing altitude rate signal, and
washout circuit means responsive to said altitude rate signal for generating a washed out altitude rate signal to provide lead compensation.

4. The invention according to claim 1 wherein the means for generating said lead compensation signal comprises
means for providing a pitch attitude signal, and
washout circuit means responsive to said pitch attitude signal for generating a washed out pitch signal to provide lead compensation.

5. The invention according to claim 4 further including
means for providing an altitude rate signal,
summing amplifier means for combining said washed out altitude rate signal with said lead compensation of claim 4 to provide improved lead compensation.

6. The invention according to claim 4 further including
means for providing a filtered pitch attitude rate signal, and
summing amplifier means for combining said washed out pitch attitude signal with said filtered pitch attitude rate signal for generating a signal to provide lead compensation.

7. The invention according to claim 6 further including
means for providing an altitude rate signal,
washout circuit means responsive to said altitude rate signal for generating a washed out altitude rate signal, and
summing amplifier means for combining said washed out altitude rate signal with said lead compensation of claim 5 to provide improved lead compensation.

8. The invention according to claim 7 further including
means for providing a filtered normal acceleration signal,
summing amplifier means for combining said filtered normal acceleration signal with said lead compensation of claim 7 to provide improved lead compensation.

9. The invention according to claim 6 further including
means for providing a normal acceleration signal,
low pass filter means to provide a relatively low frequency cutoff to said normal acceleration signal, and
summing amplifier means for combining said low frequency cutoff normal acceleration signal with said lead compensation of claim 5 to provide improved lead compensation.

10. The invention according to claim 9 further including
low pass filter means to provide a relatively high frequency noise filter to said normal acceleration signal, and
summing amplifier means for combining said noise filter normal acceleration signal with said lead compensation of claim 9 to provide improved lead compensation.

11. The invention according to claim 1 wherein the means for generating said lead compensation signal comprises
means for providing a normal acceleration signal
first low pass filter means to provide a relatively low frequency cutoff to said normal acceleration signal,
second low pass filter means to provide a relatively high frequency noise filter to said normal acceleration signal, and
summing amplifier means for combining said low frequency cutoff normal acceleration signal with said noise filtered normal acceleration to provide lead compensation.

12. The invention according to claim 11 further including means for switching between a flight director mode and a compensated mode comprises
means for including in the said head-up display a second horizontal bar image that is controlled by a vertical deflection signal,
means for providing a flight director pitch command bar signal,
summing amplifier means for combining said fixed angle signal with said flight director pitch command bar signal to provide a head-up display flight director pitch command bar signal to control said vertical deflection of said second horizontal bar image,
means, when flight director mode is selected, for removing said lead compensation signal from the total signal that controls said vertical deflection of the image of said first horizontal bar, and
means, when compensated mode is selected, for removing said second horizontal bar image from said headup display.

13. The invention according to claim 11 further including means for adding a velocity vector signal to the first horizontal bar deflection signal comprising
means for providing a velocity vector signal,
summing amplifier means for combining said velocity vector signal with the negative of said pitch attitude signal to provide a pitch stabilized velocity vector signal,
first multiplier circuit means for generating a gain changed velocity vector signal using the said pitch stabilized velocity vector signal multiplied by a first function of radio altitude,
second multiplier circuit means for generating a gain changed fixed angle signal using said fixed angle signal multiplied by a second function of radio altitude, and
summing amplifier means for combining said gain changed velocity vector signal with said gain changed fixed angle signal and also with said lead compensation signal to provide an output signal to control said vertical deflection of the image of the first horizontal bar.

* * * * *